Patented Sept. 18, 1945

2,385,113

UNITED STATES PATENT OFFICE 2,385,113

VAT DYESTUFFS OF THE ANTHRIMIDE CARBAZOLE TYPE

Glen M. Smyth, Plainfield, N. J., assignor to American Cyanamid Company, New York, N. Y., a corporation of Maine No Drawing. Application October 16, 1943, Serial No. 506,571

4 Claims. (Cl. 260—316)

This invention relates to vat dyestuffs of the pentanthrimide carbazole type and more particularly such dyestuffs derived from a new kind of pentanthrimides.

The new pentanthrimides which are used in preparing the carbazole vat dyestuffs of the present invention may be represented by the following formula:

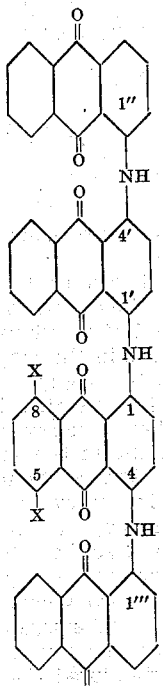

in which one X stands for hydrogen and the other X stands for the radical:

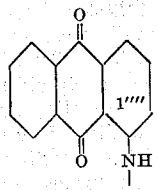

Depending on which X stands for the anthrimide radical, the vat dyestuffs of the present invention may be represented by the following formulae:

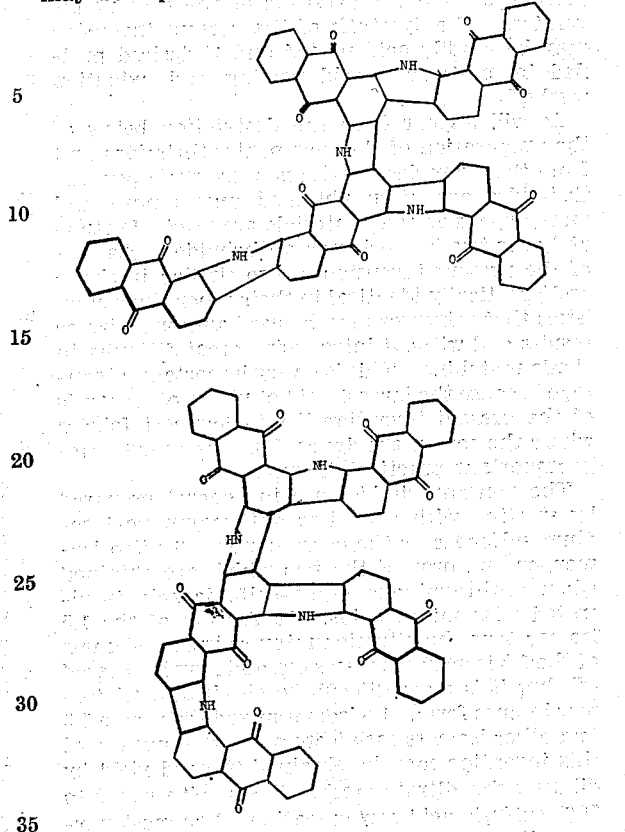

Both dyes dye cotton a greenish-olive drab from a brown vat. They have excellent fastness to washing, perspiration and water-spotting, and very good fastness to light and chlorine. The dyes also have a very important property of changing but little in shade on drying. It is thus possible for the dyer to judge the shade in the wet stage with greater ease and the dyeing operation may be speeded up and shade control improved thereby.

The new dyestuffs are cold dyes, but may also be used for printing. It is an advantage of the new dyestuffs that they vat readily, the vatting conditions not being critical as to amounts of hydrosulfite and caustic alkali used. Because of their shade and characteristics they are particularly useful for dyeing work clothing and cotton military uniforms.

The dyestuffs of the present invention are readily prepared from the new pentanthrimides by carbazole ring closure using aluminum chloride as catalyst. The ring closure may be effected in the various ways which are customary in the art for analogous ring closures. However, the preferred method is to heat the aluminum chloride in an inert organic diluent, such as trichlorbenzene, to reaction temperature and then add in portions a mixture of the pentanthrimide and sodium carbonate. The sodium carbonate may be replaced by other acid binding agents such as other alkali metal carbonates. The dyestuff is then isolated by adding caustic alkali, steam stripping off the solvent and filtering. The preferred process referred to above is not claimed generally for ring closure of anthrimide compounds, that forming the subject matter of a copending application of Smyth and Cullinan, Serial No. 506,572, filed October 16, 1943. Its use is claimed in the present application only in connection with the production of the new pentanthrimide vat dyestuffs of the present invention. The dyestuffs of the present invention may be readily acid pasted and if desired purified by customary acid pasting and oxidation methods.

As will appear from the description below of the preparation of the new pentanthrimides and from the examples, mixtures of isomeric pentanthrimides are often obtained unless pure and more expensive raw materials are used. Fortunately the two isomeric pentanthrimide carbazoles of the present invention are so similar in shade and practically identical in their other characteristics that mixtures may be used without adverse results and without introducing great difficulty in shade matching. This is a very important advantage because the largest field of utility of dyestuffs of the present invention lies in low cost fabrics where the cost of the dyestuff used is an extremely important practical feature.

The pentanthrimides are in general prepared by starting with a 5-nitro anthraquinone-1-sodium sulfonate or the corresponding 8-nitro isomer, or mixtures of the two which are obtained when anthraquinone alpha-sulfonic acid is nitrated with mixed acids. Separation of the 1,5 isomer from the nitration mixture is easy as most of the 1,5 isomer separates out and may be filtered off, but it is more difficult to obtain the 1,8 isomer in pure form. 1,8 isomer mixed with some 1,5 and other isomers satisfactory for the purpose of this invention may be obtained in good yield by diluting the filtrate mother liquor with water to 80% sulfuric acid concentration. For most purposes it is not necessary to use a chemically pure compound, although it gives the same excellent results.

The flexibility with regard to raw materials used is a very important factor in producing the new pentanthrimides which in turn are transformed into the carbazole dyestuffs of the present invention. 5-nitroanthraquinone-1-sulfonic acid is an important intermediate for some other dyestuffs and wherever a dyestuff manufacturer is producing these other dyestuffs the 1,8 isomer becomes a by-product which can be obtained very cheaply. On the other hand, if the demand for nitroanthraquinone sulfonic acids for dyestuffs of the present invention is greater than the amount of 1,8 isomer which can be obtained as a by-product, any desired proportion of the two may be used.

The next step regardless of the isomer used is to replace the sulfonic group by a chlorine atom. This procedure is effected in the conventional manner by heating with dilute hydrochloric acid and a chlorate. The corresponding nitro alpha-chloroanthraquinone is obtained and is then condensed with alpha amino anthraquinone, preferably in solution in boiling nitrobenzene using a cupriferous catalyst and an acid binding substance such as an alkali metal carbonate or acetate to unite with the hydrochloric acid set free. This reaction results in the production of either a 5 or 8 nitro-1,1'-dianthrimide having the following formula:

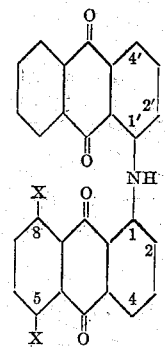

where one X stands for hydrogen and the other X for the nitro group.

The next step is nitration with mixed acid containing boric acid. The two nitro groups presumably enter the 4 and 4' positions which are the most active hydrogens in the molecule. For best results it is desirable to use an excess of nitric acid and this may result in some nitration or oxidation of the 2 or 2' position. Such reactions, however, are immaterial because in the final synthesis of the carbazoles these two positions are connected by the ring closure in any event.

The trinitro or higher nitrated compound produced by the above described nitration is then reduced to the triamino compound (possibly mixed with some β-hydroxy compound), preferably using an alkali metal sulfide as the reducing agent. The resulting compound which is probably either 4',4,5-triamino-1,1'-dianthrimide or 4',4,8-triamino-1,1'-dianthrimide is reacted with 3 molecules of alphachlor anthraquinone, preferably by heating in nitrobenzene in the presence of a cupriferous catalyst with an acid binding agent such as an alkali metal carbonate or acetate. This gives the desired pentanthrimide. If desired, a substituted alphachloranthraquinone such as 5-nitro-1-chloranthraquinone may be used to produce a substituted pentanthrimide.

The invention will be described in greater detail in the following examples, but is not limited to the details therein set forth. The parts are by weight.

EXAMPLE 1

*8-nitro-1,1'-dianthrimide*

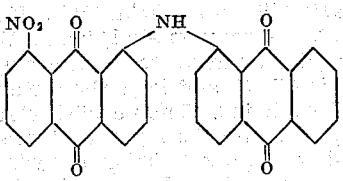

35 parts of 8-nitro-1-chloroanthraquinone (made from anthraquinone-8-nitro-1-sodium sulfonate by boiling with dilute hydrochloric acid and sodium chlorate), 25 parts alpha amino anthraquinone, 5 parts cupric chloride crystals and 48 parts soda ash are slurried in 400 parts of nitrobenzene. The mixture is heated to the boil, allowing the water formed by the reaction to distill off. After a short time the brown colored mass turns a deep red color which is characteristic of the 8-nitro-1,1'-dianthrimide. The reaction is held at the boil for 2-5 hours. On cooling the 8-nitro-1,1'-dianthrimide crystallizes out as a thick mass and can be isolated in sufficient purity by diluting the slurry with 3-4 volumes of ethanol or methanol, in which the 8-nitro-1,1'-dianthrimide is insoluble, filtering and washing with alcohol to remove the mother liquor. The soda ash is then removed by slurrying the cake in dilute hydrochloric acid, filtering, and washing acid free. A nearly theoretical yield of dry crude product is obtained in this manner. An 80% yield of slightly purer product can be obtained by filtering the cold reaction slurry from nitrobenzene, washing with very little nitrobenzene and then removing the nitrobenzene and soda ash by steam distillation and subsequent filtration and washing to freedom from alkali. 8-nitro-1,1'-dianthrimide is a bright red crystalline product appreciably soluble in nitrobenzene and in high boiling solvents. It is soluble in cold sulfuric acid with a yellow-olive-green color. It is altered by hot concentrated sulfuric acid. It is nearly insoluble in cold alcohol.

In this example there may be used instead of a pure 8-nitro-1-chloroanthraquinone a product which is obtained by removing the 1,5 isomer from the crude nitration mixture of anthraquinone alpha sulfonic acid by filtration, by diluting the filtrate to a sulfuric acid concentration of 80% and recovering a crude 8-nitroanthraquinone-1-sulfonic acid by filtration and by chlorinating the latter product with dilute hydrochloric acid and sodium chlorate at the boil.

EXAMPLE 2

*5-nitro-1,1'-dianthrimide*

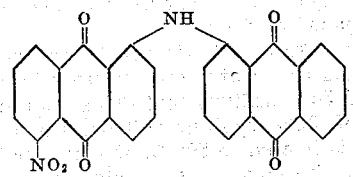

35 parts of 5-nitro-1-chloroanthraquinone (made from anthraquinone-5-nitro-1-sulfonic acid by boiling with dilute hydrochloric acid and sodium chlorate), 25 parts alpha amino anthraquinone, 5 parts cupric chloride crystals and 48 parts soda ash are slurried in 400 parts of nitrobenzene. The mixture is heated to the boil allowing the water formed by the reaction to distill off. After a short time the brown colored mass turns a deep red color which is characteristic of the 5-nitro-1,1'-dianthrimide. The reaction is held at the boil for 2-5 hours. On cooling the 5-nitro-1,1'-dianthrimide crystallizes out as a thick mass and can be isolated in sufficient purity by diluting the slurry with 3-4 volumes of ethanol or methanol, in which the 5-nitro-1,1'-dianthrimide is insoluble, filtering and washing with alcohol to remove the mother liquor. The soda ash is then removed by slurrying the cake in dilute hydrochloric acid, filtering and washing acid free. A nearly theoretical yield of dry crude product is obtained in this manner. An 80% yield of slightly purer product can be obtained by filtering the cold reaction slurry from nitrobenzene, washing with very little nitrobenzene and then removing the nitrobenzene and soda ash by steam distillation and subsequent filtration and washing to freedom from alkali.

This 5-nitro-1,1'-dianthrimide resembles the 8-nitro-1,1'-dianthrimide in appearance. It also dissolves in concentrated sulfuric acid with a yellow-olive color. It is nearly insoluble in cold alcohol, but is soluble in hot mononitrobenzene, but to a lesser degree than is the 8-nitro-1,1'-dianthrimide.

EXAMPLE 3

*Crude mixture of 8-nitro and 5-nitro-1,1'-dianthrimides*

35 parts of the crude mixture of 8-nitro- and 5-nitro-1-chloroanthraquinone (obtained by diluting the crude nitration mixture of anthraquinone alpha sulfonic acid without removal of the 1,5 isomer to a sulfuric acid concentration of 80%, filtering the precipitated mixture of nitrosulfonic acids and chlorinating it by boiling with dilute hydrochloric acid and sodium chlorate), 25 parts alpha amino anthraquinone, 5 parts cupric chloride crystals and 45 parts soda ash are slurried in 400 parts of nitrobenzene. The mixture is heated to the boil, allowing the water formed by the reaction to distill off. After a short time the brown colored mass turns a deep red color. The reaction is held at the boil for 2-5 hours. On cooling the nitro-1,1'-dianthrimides crystallize out as a thick mass and can be isolated in sufficient purity by diluting the slurry with 3-4 volumes of ethanol or methanol, in which the nitro-1,1'-dianthrimides are insoluble, filtering and washing with alcohol to remove the mother liquor. The soda ash is then removed by slurrying the cake in dilute hydrochloric acid, filtering and washing acid free. A nearly theoretical yield of dry crude product is obtained in this manner. An 80% yield of slightly purer product can be obtained by filtering the cold reaction slurry from nitrobenzene, washing with very little nitrobenzene and then removing the nitrobenzene and soda ash by steam distillation and subsequent filtration and washing to freedom from alkali. The mixture of nitro-1,1'-dianthrimides is of bright red color. It is appreciably soluble in nitrobenzene and in high boiling solvents. It is soluble in cold sulfuric acid with a yellow-olive-green color.

It is altered by hot concentrated sulfuric acid. It is nearly insoluble in cold alcohol.

EXAMPLE 4

*8,4,4'-triamino-1,1'-dianthrimide*

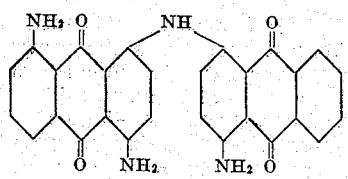

12 parts of anhydrous boric acid are dissolved in 500 parts 98% sulfuric acid at 50° C. The charge is then cooled to 30° C. and 40 parts of the 8-nitro-1,1'-dianthrimide of Example 1 are then stirred in until a complete blue solution is obtained. The charge is cooled to 10–15° C. and at this temperature there are added under external cooling 51 parts (which is in excess) of the nitrating acid (49% nitric acid, 45% sulfuric acid, and 6% water) during one half hour. When the nitrating acid is all in the temperature is allowed to rise 25–27° C. and kept there three hours longer under stirring. The purplish-blue charge is then poured into 2000 parts of cold water, stirred well and heated to 90° C. to hydrolyze the boric acid esters. Upon heating, the slurry first becomes purplish-red, then brick-red, and eventually orange-brown in color. It is then filtered hot and washed acid free.

The filter cake is well dispersed by slurrying it in 2000 parts cold water and reduced by adding 28 parts of 50% sodium hydroxide solution and 85 parts of 32% sodium sulfhydrate solution. The slurry is heated to 50° C. at which point the product for the most part dissolves to give a green-black solution. After one-half hour at this temperature, the temperature is raised to the boil in about 30 minutes. A test at this point by spotting a drop on filter paper alongside a drop of ferrous sulfate solution will show the presence of excess sodium sulfide by a black line at the point of contact of the outrun of the spots. The reduction product precipitates. After holding for one-half hour at the boil, adding more sodium sulfide if necessary, the slurry is filtered hot and washed with hot water until the filtrate, which at first is dark purple, becomes water-white. The filter cake is dried at 80–90° C., yielding a slightly bronzy-black powder in practically theoretical yield. This product is mainly 8,4,4'-triamino-1,1'-dianthrimide. It is soluble in concentrated sulfuric acid with a blue color. It contains three active amino groups and may or may not contain also a hydroxyl group in position 2 or 2'.

EXAMPLE 5

*5,4,4'-triamino-1,1'-dianthrimide*

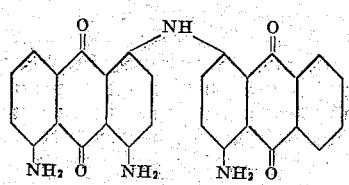

12 parts of anhydrous boric acid are dissolved in 500 parts 98% sulfuric acid at 50° C. The charge is then cooled to 30° C. and 40 parts of the 5-nitro-1,1'-dianthrimide of Example 2 are then stirred in until a complete blue solution is obtained. The charge is cooled to 10–15° C. and at this temperature there are added under external cooling 51 parts (which is in excess) of nitrating acid (49% nitric acid, 45% sulfuric acid, and 6% water) during one-half hour. When the nitrating acid is all in the temperature is allowed to rise to 25–27° C. and kept there three hours longer under stirring. The purplish-blue charge is then poured into 2000 parts of cold water, stirred well and heated to 90° C. to hydrolyze the boric acid esters. Upon heating the slurry first becomes purplish-red, then brick-red and eventually orange-brown in color. It is then filtered hot and washed acid free.

The filter cake is well dispersed by slurrying it in 2000 parts of cold water and reduced by adding 28 parts of 50% sodium hydroxide solution and 85 parts of 32% sodium sulfhydrate solution. The slurry is heated to 50° C. at which point the product for the most part dissolves as a green-black solution. After one-half hour at this temperature, the temperature is raised to the boil in about 30 minutes. A test at this point by spotting a drop on filter paper alongside a drop of ferrous sulfate solution will show the presence of excess sodium sulfide by a black line at the point of contact of the outrun of the spots. The reduction product precipitates. After holding for one-half hour at the boil, adding more sodium sulfide if necessary, the slurry is filtered hot and washed with hot water until the filtrate, which at first is dark purple, becomes water-white. The filter cake is dried at 80–90° C., yielding a slightly bronzy-black powder in practically theoretical yield. This produce is 5,4,4'-triamino-1,1'-dianthrimide. It is soluble in concentrated sulfuric acid with a blue color. It contains three active amino groups and may or may not contain also a hydroxyl group in position 2 or 2'.

EXAMPLE 6

*Crude mixture of 5, and 8,4,4'-triamino-1,1'-dianthrimides*

12 parts of anhydrous boric acid are dissolved in 500 parts 98% sulfuric acid at 50° C. The charge is then cooled to 30° C. and 40 parts of the mixed nitro-1,1'-dianthrimide of Example 3 are then stirred in until a complete blue solution is obtained. The charge is cooled to 10–15° C. and at this temperature, using external cooling, there are added 51 parts (which is in excess) of nitrating acid (49% nitric acid, 45% sulfuric acid, and 6% water) during one-half hour. When the nitrating acid is all in the temperature is allowed to rise to 25–27° C. and kept there three hours longer under stirring. The purplish-blue charge is then poured into 2000 parts of cold water, stirred well and heated to 90° C. to hydrolyze the boric acid esters. Upon heating the slurry first becomes purplish-red, then brick red and eventually orange-brown in color. It is then filtered hot and washed acid free.

The filter cake is well dispersed by slurrying it in 2000 parts cold water and reduced by adding 28 parts of 50% sodium hydroxide solution and 85 parts of 32% sodium sulfhydrate solution. The slurry is heated to 50° C. at which point the product for the most part dissolves as a green-black solution. After one-half hour at this temperature the temperature is then raised to the boil in about 30 minutes. A test at this point by spotting a drop on filter paper alongside a drop of ferrous sulfate solution will show the presence of excess sodium sulfide by a black line at the point of contact of the outrun of the spots. The reduction product precipitates. After holding for one-half hour at the boil, adding more sodium sulfide if necessary, the slurry is filtered hot and washed with hot water until the filtrate, which at first is dark purple, becomes water-white. The filter cake is dried at 80–90° C., yielding a slightly bronzy-black powder in practically theoretical yield. This product is mainly a mixture of 5 and 8,4,4'-triamino-1,1'-dianthrimides. It is soluble in concentrated sulfuric acid with a blue color. It contains three active amino groups and may or may not contain also hydroxyl groups.

EXAMPLE 7

*1'',4',1',1,4,1''',8,1''''-pentanthrimide*

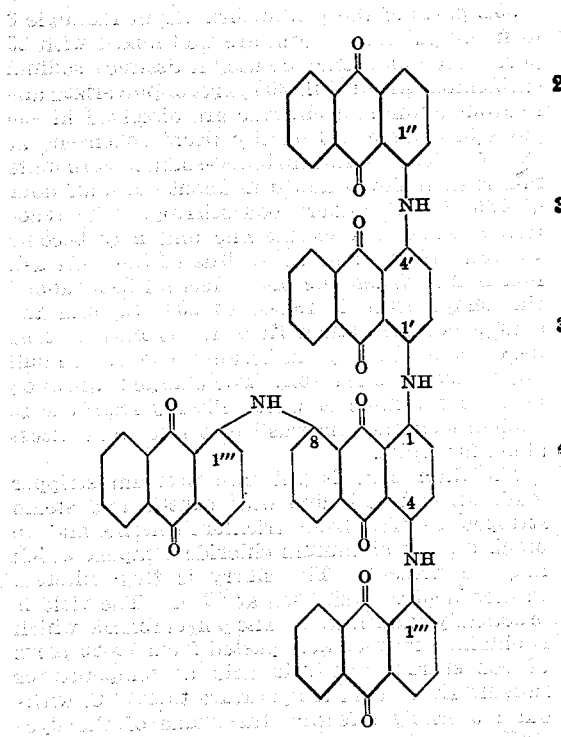

50.4 parts of the 8,4,4'-triamino-1,1'-dianthrimide of Example 4, in well pulverized form, 78 parts of 1-chloroanthraquinone, 1142 parts nitrobenzene, 87 parts sodium carbonate, 5 parts copper powder and 5 parts iodine crystals are refluxed at approximately 210° C. for four hours, allowing the water of reaction to distill off. The reaction mass becomes a purple-black slurry giving a purple-gray outrun when spotted upon filter paper. After cooling to room temperature the slurry is filtered, washed with 100 parts nitrobenzene and steam stripped to remove the residual nitrobenzene and to dissolve out the sodium carbonate. The slurry, after filtering, is dried at 90% C. A yield of 90% or better can be obtained. The product is a black colored powder, soluble in concentrated sulfuric acid with a yellow-olive color. It is insoluble cold in nearly all organic solvents, but is slightly soluble in hot high-boiling solvents. Analysis and chemical reactions show it to be the trianthraquinonyl derivative of 8,4,4'-triamino-1,1'-dianthrimide.

EXAMPLE 8

*1'',4',1',1,4,1''',5,1''''-pentanthrimide*

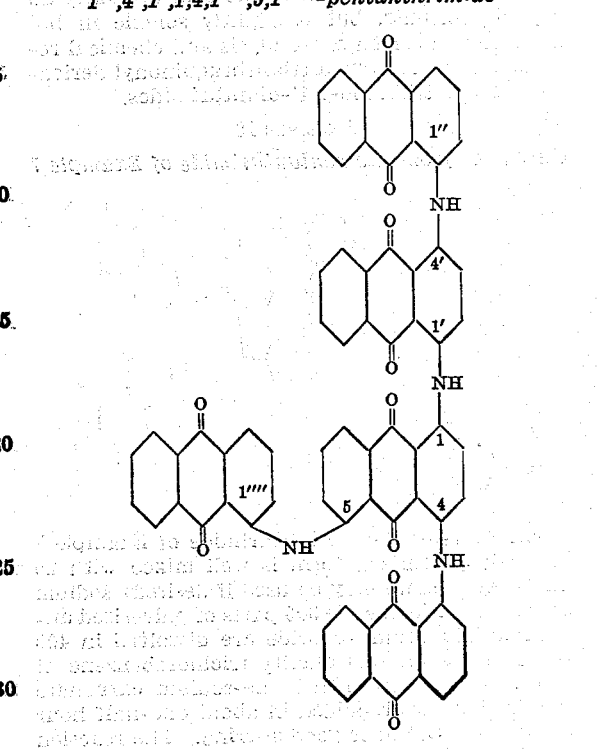

50.4 parts of the 5,4,4'-triamino-1,1'-dianthrimide of Example 5, in well pulverized form, 78 parts of 1-chloroanthraquinone, 1142 parts nitrobenzene, 87 parts sodium carbonate, 5 parts copper powder and 5 parts iodine crystals are refluxed at approximately 210° C. for four hours allowing the water of reaction to distill off. The reaction mass becomes a purple-black slurry giving a purple-gray outrun when spotted upon filter paper. After cooling to room temperature, the slurry is filtered, washed with 100 parts nitrobenzene and steam stripped to remove the residual nitrobenzene and to dissolve out the sodium carbonate. The slurry, after filtering, is dried at 90° C. A yield of 90% or better can be obtained. The product is a black colored powder, soluble in concentrated sulfuric acid with a yellow-olive color. It is insoluble cold in nearly all organic solvents, but is slightly soluble in hot high-boiling solvents. Analysis and chemical reactions show it to be a trianthraquinonyl derivative 5,4,4'-triamino-1,1'-dianthrimide.

EXAMPLE 9

*Mixture of the two isomeric pentanthrimides*

50.4 parts of the mixture of triamino dianthrimides described in Example 6, in well pulverized form, 78 parts of 1-chloroanthraquinone, 1142 parts nitrobenzene, 87 parts sodium carbonate, 5 parts copper powder and 5 parts iodine crystals are refluxed at approximately 210 C. for four hours, allowing the water of reaction to distill off. The reaction mass becomes a purple-black slurry giving a purple-gray outrun when spotted upon filter paper. After cooling to room temperature, the slurry is filtered, washed with 100 parts nitrobenzene and steam stripped to remove the residual nitrobenzene and to dissolve out the sodium carbonate. The slurry, after filtering, is dried at 90° C. A yield of 90% or better can be obtained. The product is a black colored powder, soluble in concentrated sulfuric acid with a yellow-olive color. It is insoluble cold in nearly all organic solvents, but is slightly soluble in hot high-boiling solvents. Analysis and chemical reactions show it to be a trianthraquinonyl derivative of the triamino-1,1'-dianthrimides.

EXAMPLE 10

*Carbazole from the pentanthrimide of Example 7*

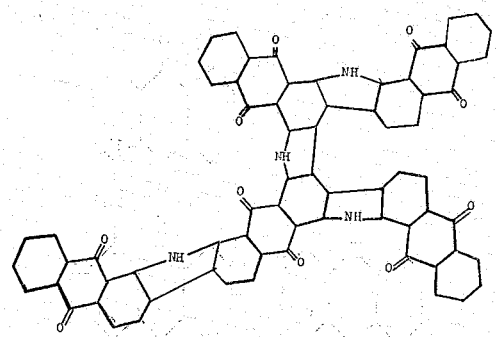

50.5 parts of the pentanthrimide of Example 7 in finely pulverized form is well mixed with 25 parts (even more may be used if desired) sodium carbonate. Meanwhile 300 parts of pulverized anhydrous aluminum chloride are dissolved in 400 parts of commercial quality trichlorobenzene at 180° C. The pentanthrimide-sodium carbonate mix is then slowly added in about one-half hour at 180–200° C. under good stirring. The reaction is somewhat exothermic and may become vigorous after about two-thirds of the soda ash mix is in. When the latter has all been added the temperature is raised to 200° C., and the charge becomes much thicker. It must not be heated long at this point because to do so will dull and weaken the dyestuff. The charge is drowned in a large volume of water, filtered from excess trichlorobenzene and washed to free from excess aluminum salts.

The filter cake is put into a steam stripper, made strongly alkaline with caustic and stripped to free from trichlorobenzene and to break up any aluminum chloride complex which may be present. The slurry is then filtered, washed neutral and dried at 90° C. The yield is practically quantitative. The polycarbazole which is obtained may be acid pasted from 10–20 parts of concentrated sulfuric acid at temperatures ranging from room temperature to 190° C. without materially affecting the shade of the dyestuff.

The product so obtained is black, giving with alkaline sodium hydrosulfite a brown colored vat from which cotton is dyed a very fast and desirable greenish-olive drab shade of great intensity. The dyestuff is only slightly soluble in most high-boiling solvents, but is soluble in concentrated sulfuric acid with a brownish-purple color from which it is precipitated on pouring into water as blackish-olive flocs.

In this example the usages of both trichlorobenzene and aluminum chloride may be varied widely. Instead of, or together with trichlorobenzene other diluents, such as organic nitriles, acid halides, tertiary cyclic bases such as pyridine or dimethylaniline may be used. The aluminum chloride may be used also in the form of its compounds with sulfur dioxide or with sodium chloride. However, the activity of the different ring closing agents varies to the effect that a different number of carbazole rings might be closed which results in dyestuffs of somewhat different shades and properties.

EXAMPLE 11

*Carbazoles of the pentanthrimide of Example 8*

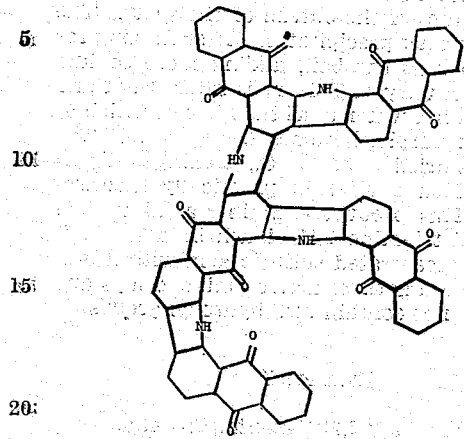

50.5 parts of the pentanthrimide of Example 8 in finely pulverized form are well mixed with 25 parts (even more may be used if desired) sodium carbonate. Meanwhile 300 parts of pulverized anhydrous aluminum chloride are dissolved in 400 parts of commercial quality trichlorobenzene at 180° C. The pentanthrimide-sodium carbonate mix is then slowly added in about one-half hour at 180–200° C. under good stirring. The reaction is somewhat exothermic and may become vigorous after about two-thirds of the soda ash mix is in. When the latter has all been added the temperature is raised to 200° C., and the charge becomes much thicker. It must not be heated long at this point because to do so will dull and weaken the dyestuff. The charge is drowned in a large volume of water, filtered from excess trichlorobenzene and washed to free from excess aluminum salts.

The filter cake is put into a steam stripper made strongly alkaline with caustic and steam stripped to free from trichlorobenzene and to break up any aluminum chloride complex which may be present. The slurry is then filtered, washed neutral and dried at 90° C. The yield is practically quantitative. The polycarbazole which is obtained may be acid pasted from 10–20 parts of concentrated sulfuric acid at temperatures ranging from room temperature to 190° C. without materially affecting the shade of the dyestuff.

The product so obtained is black and gives with alkaline sodium hydrosulfite a brown colored vat from which cotton is dyed a very fast and desirable greenish-olive drab shade of great intensity. The dyestuff is only slightly soluble in most high-boiling solvents, but is soluble in concentrated sulfuric acid with a brownish-purple color from which it is precipitated on pouring into water as blackish-olive flocs.

This dyestuff dyes similar shades and has similar properties to the dyestuff of Example 10.

EXAMPLE 12

*Carbazole mixture from the pentanthrimide mixture of Example 9*

50.5 parts of the pentanthrimide mixture of Example 9 in finely pulverized form are well mixed with 25 parts (even more may be used if desired) sodium carbonate. Meanwhile 300 parts of pulverized anhydrous aluminum chloride are dissolved in 400 parts of commercial quality trichlorobenzene at 180° C. The pentanthrimide sodium carbonate mix is then slowly added in about one-half hour at 180–200° C. The pentanthrimide sodium carbonate mix is then slowly added in about one-half hour at 180–200° C. under good stirring. The reaction is somewhat exothermic and may become vigorous after about two-thirds of the soda ash mix is in. When the latter has all been added the temperature is raised to 200° C., and the charge becomes much thicker. It must not be heated long at this point because to do so will dull and weaken the dyestuff. The charge is drowned in a large volume of water, filtered from excess trichlorobenzene and washed free from excess aluminum salts.

The filter cake is put into a steam stripper made strongly alkaline with caustic and steam stripped to free from trichlorobenzene and to break up any aluminum chloride complex which may be present. The slurry is then filtered, washed neutral and dried at 90° C. The yield is practically quantitative. The polycarbazole which is obtained may be acid pasted from 10–20 parts of concentrated sulfuric acid at temperatures ranging from room temperature to 190° C. without materially affecting the shade of the dyestuff.

The product so obtained is black and gives with alkaline sodium hydrosulfite a brown colored vat from which cotton is dyed a very fast and desirable greenish-olive drab shade of great intensity. The dyestuff is only slightly soluble in most high-boiling solvents, but is soluble in concentrated sulfuric acid with a brownish-purple color from which it is precipitated on pouring into water as blackish-olive flocs.

This dyestuff dyes similar shades and has similar properties to the dyestuffs of Examples 10 and 11.

I claim:

1. Vat dyestuffs being the carbazoles obtained by ring closure with aluminum chloride of pentanthrimides having the formula:

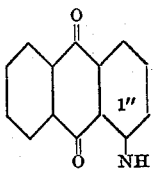

where one X stands for the group and the other X stands for hydrogen.

2. A vat dyestuff having the formula:

dyeing cotton a greenish-olive drab from a brown vat.

3. A vat dyestuff having the formula:

dyeing cotton a greenish-olive drab from a brown vat.

4. A vat dyestuff comprising a mixture of the vat dyes of claims 2 and 3.

GLEN M. SMYTH.